Aug. 11, 1959  P. B. NEWTON, JR  2,898,880
SINGLE PANEL ILLUMINATED INSTRUMENT DIAL
Filed Oct. 4, 1956  3 Sheets-Sheet 1

INVENTOR
PERRY B. NEWTON, Jr.

BY *George Sipkin*
*B. L. Zangwill*
ATTORNEY

Aug. 11, 1959   P. B. NEWTON, JR   2,898,880
SINGLE PANEL ILLUMINATED INSTRUMENT DIAL
Filed Oct. 4, 1956   3 Sheets-Sheet 2

INVENTOR
PERRY B. NEWTON, Jr.

BY
ATTORNEY

Aug. 11, 1959    P. B. NEWTON, JR    2,898,880
SINGLE PANEL ILLUMINATED INSTRUMENT DIAL
Filed Oct. 4, 1956    3 Sheets-Sheet 3
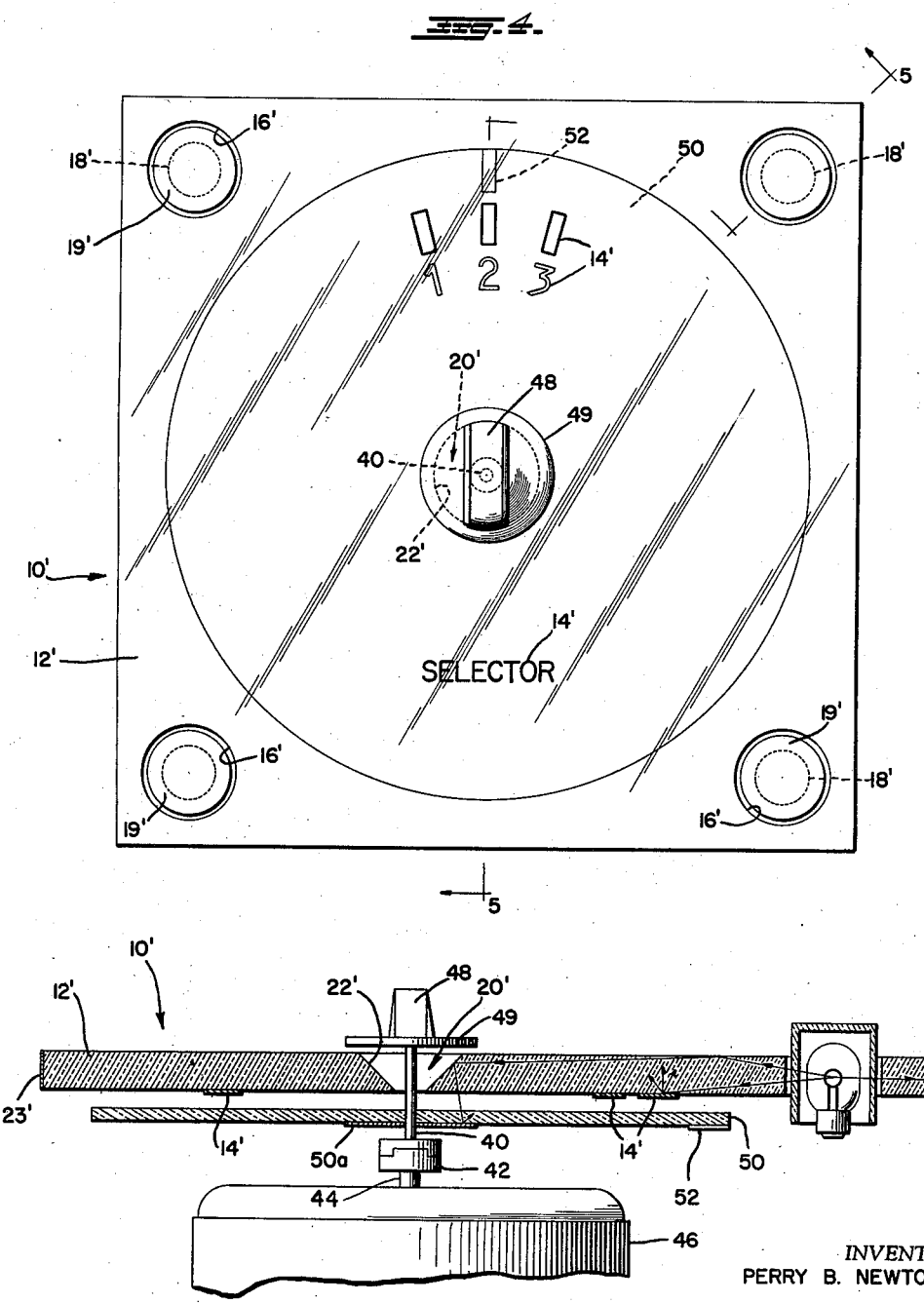
INVENTOR
PERRY B. NEWTON, Jr.
BY
ATTORNEY

2,898,880

SINGLE PANEL ILLUMINATED INSTRUMENT DIAL

Perry B. Newton, Jr., Annapolis, Md.

Application October 4, 1956, Serial No. 614,035

3 Claims. (Cl. 116—129)

(Granted under Title 35, U.S. Code (1952), sec. 266)

The invention described herein may be manufactured and used by or for the Government of the United States of America for governmental purposes without the payment of any royalties thereon or therefore.

This invention relates to illumination, and more particularly it relates to edge illumination of dials, pointers, knobs and the like.

The purpose of this invention is to provide internal illumination for indicating panels, dials, pointers, and knobs in such a manner as to render dial markings, pointers, knobs, and index markings visible. The illumination of the structure to be viewed is accomplished by the use of one or more sources of light located in the instrument enclosure and in or near the instrument panel but remote from the areas—for example, dial graduations and knobs—to be viewed. Further, the purpose of this invention is to provide an illumination system for a dial or pointer used in an instrument enclosure which enables viewing of the dial and pointer at angles heretofore not possible with available illumination systems. This purpose may be further extended to provide an illumination system for a console type panel and knobs for use therewith which precludes the necessity for using more than one panel, thus simplifying the building of such displays, while at the same time not sacrificing the functionality of the illuminated display. Moreover, this invention as applied to both instrument dials and console type panels with knobs and pointers, allows most effective use of the light available from the light sources employed to illuminate in a very direct manner the elements to be rendered luminous and as a direct result makes possible the illumination of larger areas with a minimum input of light flux to the illumination system.

A general object of this invention is to improve the illumination of indicating panels, dials, pointers, knobs and the like.

Another object is to extract the light from the single indicator panel in selected areas to render those areas visible.

Another object is to project light from an indicator panel, which is also the light distributing panel, into the pointer and knobs which in turn direct the light through reflection and refraction to the immediate areas to be viewed where the light is then extracted from these structures by suitable means to render the desired areas visible.

Yet another object is to provide an illumination system for indicating instruments which allows the greatest possible angle of view by the observer of enclosed instruments.

Still another object is to provide an illumination system for panels, pointers, knobs, and index markings which makes use of the available light flux to more directly illuminate the desired areas, thereby minimizing light losses which are inherent in presently available illumination systems using a greater number of parts through which the light must pass before the desired areas are illuminated.

An additional object of the invention herein described is to provide an illumination system for indicating instruments, said system using a window in the instrument enclosure structure as the light distributing panel and the indicia bearing panel and also as the means for conveying, or transmitting, light to the pointer.

Another object is to provide an illumination system for console type panels, scuch system using the light distributing panel as the indicia panel and as the means for directing light to knobs and pointers.

Another object is to provide an illumination system for knobs, or pointers, of new and unique structure and design, such system consisting of light distributing panel serving as indicia bearing panel for markings, or indicia, which remain stationary in the display and said light distribution panel serving as the means of directing light into the illuminable part of the knob, such illuminable part being positioned as desired with respect to the fixed panel bearing the aforementioned indicia.

Another object is to provide a combination comprised of light-distributing panel which is also the indicia bearing panel and means for directing light from therein to the pointer, aforesaid combination being of such unique and novel structure as to enable viewing from large angles as measured to the normal to the major plane of the indicator dial.

A related object here provides unique and novel structure which permits design of instrument enclosures of more compact form than previously possible and eliminates various elements heretofore required in the illuminating structures of indicating instruments without eliminating the function of such elements.

In a typical known method for illuminating dials and pointers of indicating instruments, there is required a separate light distributing panel and an indicia panel. The light distributing panel, the indicia panel, and the pointer are positioned behind a separate window of the instrument enclosure and in this method of instrument illumination the indicia panel must be positioned a considerable distance back of the window to allow adequate space for a pointer to be positioned around the dial face with respect to the graduated indicia. Also, a masking ring must be provided to prevent the escape of undesired stray light around the periphery of the indicia and light-distributing panels.

One disadvantage of the old method is the requirement of a relatively great number of parts to achieve the illumination of the indicia and the pointer or pointers; for example, a separate light distributing panel, an indicia panel, a closure window and a masking ring. Another disadvantage is that the angle of view of the instrument using this known method is quite limited and increase in the angle of view requires a window opening and an enclosure of unreasonable diameter. Yet another disadvantage of the old method is that it requires excessive space from front to back of the instrument in order to house the additional required components and to allow the necessary operating space between actuating mechanism and the light-distributing panel and between the indicia panel and the pointer and between the pointer and the instrument enclosure window.

In accordance with one embodiment of the instant invention, the light distributing panel serves as the indicia panel, as the means for transmitting light to the pointer, and as the window of the instrument enclosure. Light from the sources is introduced into the light distributing panel and transmitted by a combination of total internal reflections, direct radiation and refractions to the indicia on the inner side of the panel and to the pointer which is put behind this panel. The indicia being formed by scratches or engravings or suitable reflective coatings or other methods of altering the air-plastic or air-glass interface are rendered luminous to an observer viewing the instrument. Light is directed from the light distributing panel into the pointer hub by redirecting the light rays.

The simplest, but by no means the only, method of redirecting light rays into the hub of the pointer is by specular reflection from a polished, beveled surface located in the light distributing panel directly above the hub of the pointer. A substantial portion of the light rays that penetrate the hub of the pointer is then directed through the pointer to the areas thereof to be rendered luminous, those areas prepared in a manner similar to the indicia previously described. As viewed under daylight conditions the indicia and pointers are usually seen as white against a black background, the black background being provided by an opaque black panel. This black opaque panel need not be an extra part but may well be the same chassis panel to which are secured the actuating mechanisms, the lamp sockets, the light distributing panel and other parts of the indicating instrument. As the indicating instrument is viewed under darkened ambient conditions the indicia and the pointer are made visible by virtue of the light emanating therefrom. Under these conditions the light may be red or any other desired color which may be chosen by the selection of optical filters surrounding the light source or sources.

A second embodiment discloses the invention as applied to the knobs and panels. Here light introduced into the light distributing panel is transmitted to indicia applied to the reverse surface of the panel thereby rendering luminous those indicia that remain stationary with respect to the overall panel. Light from the light distributing panel is directed into the underneath part of a knob or pointer portion where a substantial amount of the light is directed to the areas of usefulness where in turn the light rays render the desired indicia visible. In this second embodiment, an advantage is seen in that the movable illuminated indicia can by the method displayed be remote from the knob handle. This is advantageous in numerous applications because the hand operating the knob will not obscure the movable indicia which must be viewed more critically than the stationary or fixed indicia.

The advantages of this invention over what has been done before as presented in the previous discussion and description, are recounted in part as follows: This invention provides a much greater angle of view for the dials and pointers of illuminated instruments than heretofore possible with other methods. It eliminates the need for many of the parts of conventional illumination systems thereby reducing complexity and cost of manufacture. It eliminates light losses that occur in other systems between the light-transmitting panel and the indicia panel. It provides a method for compactness of design not heretofore possible both in breadth and depth of indicating instruments. It provides additional functional purposes for the part ordinarily used as the window glass in indicating instruments.

The invention, together with the above and other objects and advantages thereof, is set forth in more technical detail in the following description and accompanying drawings, wherein:

Figure 4 is a top plan view, similar to Fig. 1, and illustrating a second embodiment of the invention; and Figure 5 is a section taken on line 5—5 of Fig. 4.

Figure 1:
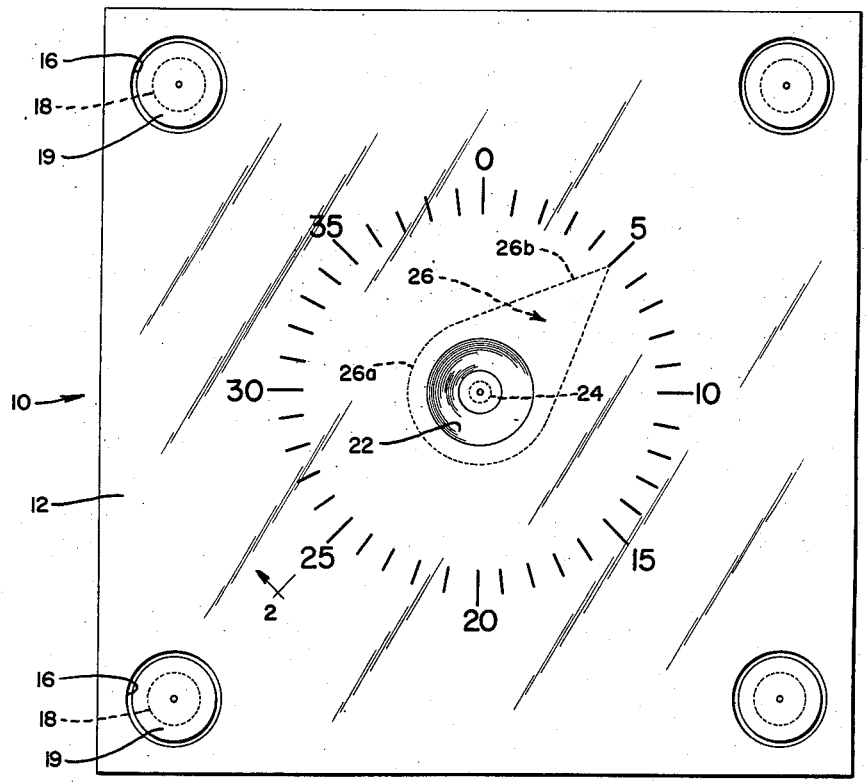
Figure 1 is a top plan view of an illuminated dial and pointer in accordance with one embodiment of this invention, with the instrument casing omitted for clarity of illustration.
Figure 2:
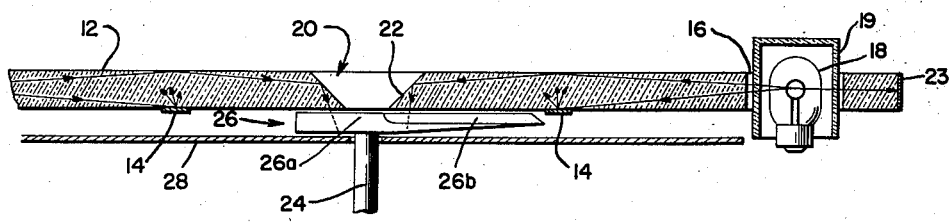
Figure 2 is a diagonal section taken on line 2—2 of Figure 1.

Referring first to Figs. 1 and 2 of the drawings, in accordance with this invention the dial indicated generally by reference character 10, includes a generally square panel 12. Panel 12, which serves as a light-transmitting panel, an indicia-bearing panel and an instrument-closure window (Fig. 3), comprises a relatively plane, highly transparent plate, having its front and back surfaces in parallel relation to each other and polished to provide smooth optical surfaces. Panel 12 is preferably fabricated from an acrylic resin or methyl methacrylate material of the thermoplastic type such as, for example, commercial "Plexiglas" or "Lucite." Suitable numerals, graduations or other indicia or the like, shown in Fig. 1, and indicated at 14 in Fig. 2, are engraved and/or painted, preferably white, on the back or reverse surface of the panel.

Panel 12 is provided with a cylindrical opening 16 at each of its four corners, in each of which openings is centered a miniature lamp bulb 18 provided with a red filter 19. At its center, the panel is provided with an opening 20 bound by a beveled surface 22, formed as a truncated cone with a slant or bevel preferably of 45°, as shown in Fig. 2. The beveled surface is polished so as to provide a smooth optical surface, and if desired, the beveled surface may be coated with a metallic or dielectric light reflecting material. The surface of the outer edges of panel 12 is coated with an efficient light-reflecting material 23 (Fig. 2).

Centered below the opening 20 in panel 12 is a shaft 24, forming part of a control mechanism, not shown, upon which is mounted a pointer 26. The pointer is made of clear, light-transmitting plastic with the hub portion, 26a, thereof coated at its side and bottom surfaces with a white, light-reflecting coating upon which is placed a black, opaque coating. As shown, the converging edges, 26b, of the pointer proper are beveled, which beveled edges are coated with a white, light-reflecting material. An opaque black panel 28, against which the pointer and dial markings are viewed, is located beneath the pointer.

Figure 3:
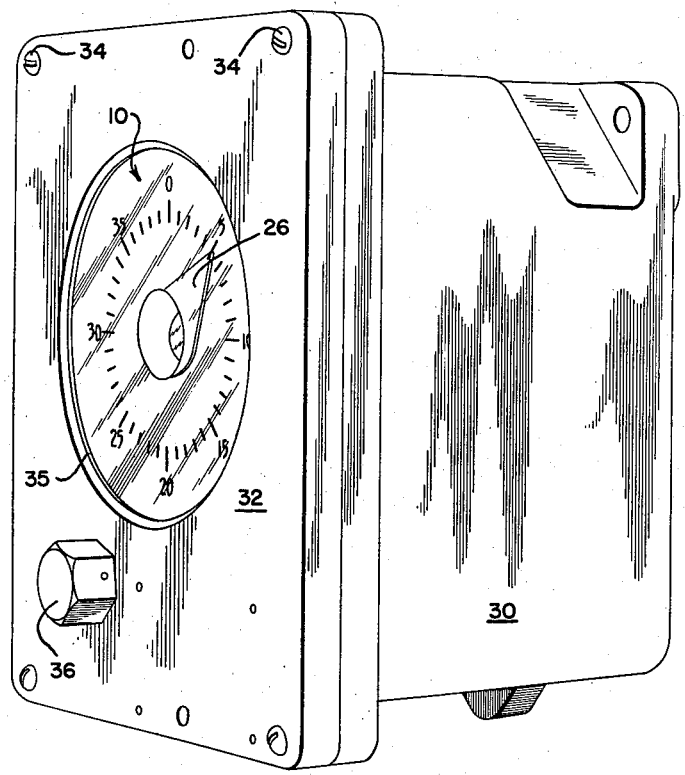
Figure 3 is a perspective view of an actual instrument incorporating the dial and pointer of Figs. 1 and 2, and illustrating the improved angle of view made possible by this invention.

Referring now to Fig. 3. of the drawing, the dial 10, which forms part of an instrument, not shown, is located within an instrument casing 30, provided with a closure member or front cover 32, which cover is removably attached to the casing by four corner screws 34. A control knob 36 is accessible at the front of the cover. As shown, the cover member is provided with a circular opening 35 behind which is centered the dial 10, and which opening is closed by the panel 12. Thus, as pointed out heretofore, panel 12 serves as a light-transmitting panel, an indicia-bearing panel, an instrument-closure window and it eliminates the need of a masking ring.

In operation of the embodiment of the invention shown in Figs. 1, 2 and 3, light rays from the several lamps (Figs. 1 and 2) are transmitted through panel 12 toward the center thereof. Certain of the light rays are transmitted directly from the lamps through the panel and others are reflected by the coating 23 on the surface of the outer edges and then through the panel toward the center. In passing through panel 12, certain of the light rays impinge upon the indicia 14 (Fig. 2) on the reverse face of the panel, and other light rays continue toward the center of the panel where they are intercepted by the beveled surface 22 and redirected into the hub of the pointer. The pointer being made of clear, light-transmitting plastic and the hub thereof being coated with a black, opaque lamination on a white, reflecting coating, the light rays are piped into the pointer proper to thereby illuminate the white, beveled edges thereof. Thus, the pointer and the indicia are illuminated, which is enhanced, particularly for daytime viewing by the black background of panel 28, and, due to the proximity of the pointer and the indicia-bearing panel with the front surface of the instrument, the viewing angle is greatly increased.

Referring now to Figs. 4 and 5 of the drawings wherein the second embodiment of the invention comprises a dial 10' including a light-transmitting, indicia-bearing, window-closing panel 12'. Panel 12' is generally similar to panel 12 of Figs. 1–3, and need not be described in detail here. Mounted centrally of panel 12' and extending through the opening 20' therein is a knob shaft 40 connected by a coupling 42 to an instrument shaft 44, which shaft forms part of an instrument 46. A knob 48 having a light shield 49 thereon is mounted on the upper or outer end of shaft 40. A transparent, indicia-bearing panel 50, forming a part of knob 48 is mounted on shaft 40 directly beneath panel 12'. Panel 50 is formed with indicia 52 on the reverse surface thereof, and, so as to redirect light rays to these indicia the panel is provided at its center portion 50a with a diffusely reflecting coating similar to the opaque black on reflecting white on the hub portion 26a of pointer 26 (Fig. 2). As shown in Figs. 4 and 5, the indicia 52 on knob panel 50 may be very remotely placed with respect to the center shaft and knob handle. With this arrangement, the hand of an operator is turning the knob handle and through it the knob panel will not obscure the movable indicia 52 on panel 50 which must be viewed with more criticality than the stationary or fixed indicia 14' on panel 12'. If desired a black opaque panel, not shown but similar to panel 28, Fig. 2, may be placed beneath panel 50.

In operation, the transmission of light through panel 12' is generally similar to that through panel 12 (Figs. 1 and 2); that is light from the several lamps 18' is transmitted through panel 12' wherein certain of the light rays impinge on the stationary indicia 14' to thereby illuminate such indicia and other light rays converge toward the center of panel 12' when they are intercepted by bevel surface 22' and redirected to the hub or center portion of knob panel 50. Knob panel 50 being made of a clear transparent plastic and the lower surface of the hub portion thereof being coated with a black, opaque lamination on a white reflecting coating, the redirected light rays are piped radially through the knob panel 50 to the indicia 52 on the reverse surface of such panel near the periphery thereof. Thus, the indicia on the two panels are illuminated, the indicia on movable panel 50 are not obscured by the hand of an operator in turning the knob 48, and, when placed in an instrument casing, as in Fig. 3, the indicia may be viewed from large angles as measured to the normal to the major plane of the indicator dial.

Alternate methods of construction may be seen in part from a comparison of the structures of the two disclosed embodiments of the invention. It should be noted, however, that, although the hole in the center of the light distributing panel of the two embodiments is shown as going completely through the panel that this is not necessary and that the beveled surfaces extending partially through this panel will suffice. Further, it should be noted that a bevel is not the sole means of redirecting light at this point in the light distributing panel although it is considerably more efficient than other methods, particularly if the beveled surface is coated with aluminum or other material of high reflectance. However, a diffusing white paint, a simple polished surface or a combination of these methods may be used to achieve the purpose of redirecting the desired light rays. Also, the opening in the center of the panel may be cylindrical and a beveled surface provided on the pointer hub located within the opening. It should be further pointed out that the light distributing panel in this invention may in application to enclosed indicating instruments be attached to the enclosure cover or it may be attached to the same mounting panel or chassis to which are secured the actuating or actuated mechanisms, the lamp sockets and the like, and a seal may be maintained between this light distributing panel and the enclosure cover by use of an "O" ring or similar gasket device. In Figs. 4 and 5, the panel forming the underneath or pointer portion of the knob may of course be extended or cut down to any and many of diverse shapes and sizes in addition to that shown in the drawings. Also in Fig. 2, the element shown as a pointer may be well extended to a circular dial similar to a compass card whereas the indicia on the light distributing panel might be reference marks or the like.

Obviously many other modifications and variations of the present invention are possible in the light of the above teachings. It is therefore to be understood, that within the scope of the appended claims, the invention may be practiced otherwise than as specifically described.

What is claimed is:

1. An illuminated instrument comprising a casing formed with a circular window opening in one wall thereof, a panel for closing said window opening, said panel being substantially square in plan and formed of transparent light-transmitting material having front and rear smooth substantially parallel surfaces with the front of such surfaces in intimate contact with the rear surface of the casing wall for closing the window and with the front surface of the panel parallel with and juxtaposed with the front of the said one wall of the casing, indicia formed on the rear surface of the panel, said indicia being formed in a circle with the center thereof coinciding with the center of the circular opening in the casing and with the radius of the central opening being slightly greater than the radius of the indicia, said panel being formed with a plurality of apertures therein spaced uniformly around marginal edges thereof with one such aperture at each corner of the panel and with the center of such apertures uniformly spaced from the center of the panel, an illuminating lamp located in each of said plurality of apertures, said lamps being arranged so as to emit light rays into the panel for transmission therethrough toward the center of the panel and said indicia being located in the path of light transmission between the plurality of lamps and the center of the panel whereby certain of the light rays are intercepted by the indicia for substantial uniform illumination of the indicia, and means on the panel centrally located relative to the plurality of apertures for intercepting light rays from each of the illuminating lamps and redirecting such rays out of the panel, said light intercepting and redirecting means including a circular beveled surface in the panel centrally located relative to the plurality of apertures and to the lamps contained therein, whereby light rays from the lamps pass through the panel and converge on the circular beveled surface and are thereby redirected out of the panel, an indicator mounted in juxtaposed relation to the rear surface of the panel and centered relative to the light intercepting means on said panel for receiving the redirected light rays therefrom, the relationship and relative location of the circular opening in the one wall of the casing, the panel, the indicia and the indicator being such as to render the indicia and indicator readily viewable from the front of the casing and from relatively large angles as measured to the normal to the front surface of the panel.

2. An illuminated instrument as set forth in claim 1 wherein the indicator includes a pointer formed of transparent light-transmitting material having a hub portion thereof centered relative to the light intercepting means and having a light-reflecting coating thereon for receiving redirected light and in turn redirecting such light to extremities thereof.

3. An illuminated instrument as set forth in claim 1 wherein the indicator includes a rotatable knob having a handle portion accessible at the front surface of the panel and an indicia-bearing portion juxtaposed relative to the rear surface of the panel, and said indicia-bearing portion being formed of light-transmitting material with a central portion thereof coated with light-reflecting material and centered relative to the light intercepting means and outer portions thereof formed with indicia thereon in juxtaposed relation to the indicia on the rear surface of the panel.

References Cited in the file of this patent

UNITED STATES PATENTS

| | | |
|---|---|---|
| 2,317,182 | Dickson | Apr. 20, 1943 |
| 2,561,885 | Prideaux | July 24, 1951 |
| 2,699,141 | Gaguski | Jan. 11, 1955 |
| 2,723,342 | Neugass | Nov. 8, 1955 |
| 2,745,946 | Protzmann | May 15, 1956 |
| 2,831,453 | Hardesty | Apr. 22, 1958 |